Nov. 17, 1964 A. E. CIMOCHOWSKI 3,156,972
METHOD FOR RELINING A COMBUSTION CHAMBER WITH REFRACTORY
MATERIAL WITHOUT DISASSEMBLING THE CHAMBER
Filed April 28, 1961 2 Sheets-Sheet 1
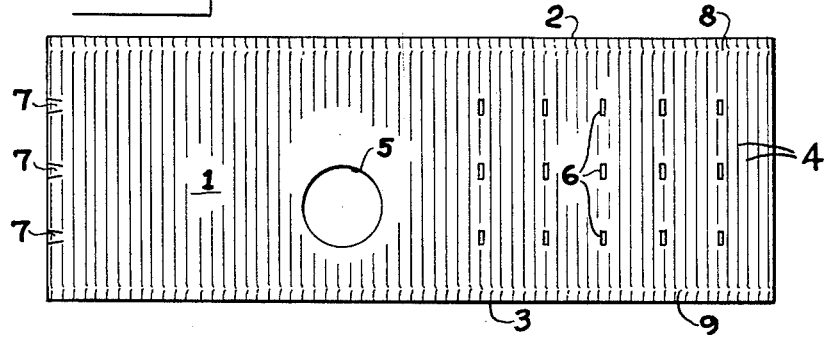
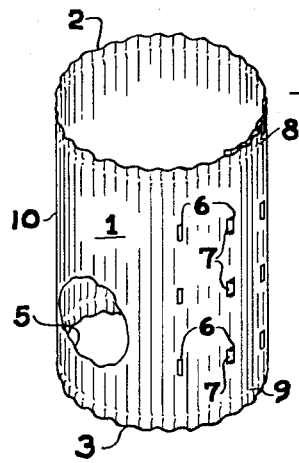
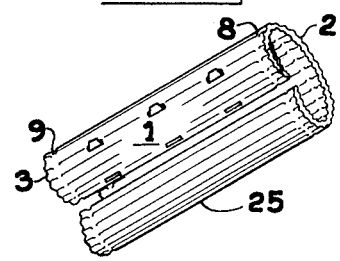
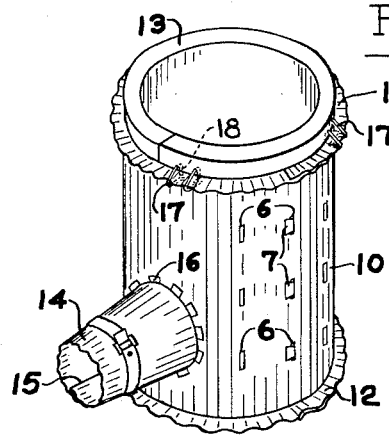
INVENTOR.
ANTHONY E. CIMOCHOWSKI
BY
*John A. McKinney*
ATTORNEY ID # United States Patent Office 3,156,972
Patented Nov. 17, 1964

3,156,972
METHOD FOR RELINING A COMBUSTION CHAMBER WITH REFRACTORY MATERIAL WITHOUT DISASSEMBLING THE CHAMBER
Anthony E. Cimochowski, Hillsborough Township, N.J., assignor to Johns-Manville Corporation, New York, N.Y., a corporation of New York
Filed Apr. 28, 1961, Ser. No. 106,246
3 Claims. (Cl. 29—401)

The instant invention relates to a combustion chamber and method for forming a combustion chamber and is particularly directed to a combustion chamber which may be utilized in the reconditioning of domestic or industrial furnaces and boilers and the method for positioning such combustion chamber in the furnace or boiler to be reconditioned.

In the reconditioning of domestic or industrial furnaces and boilers in accordance with prior art practices, it was customary to place a corrugated metallic support within an internal cavity of the furnace to be reconditioned and thereafter to insert a liner of a thermal insulating material within the support. To provide radial strength to the combustion chamber thus formed, it was customary to back fill the space between the exterior surface of the support and the walls defining the internal cavity of the furnace. However, this type of operation allowed the metallic support and the liner of thermal insulating material to collapse inwardly and thus, to allow oil from the firing device to impinge directly on the thermal insulating material thus causing excessive sooting. Also, the use of back fill resulted in excessive temperature conditions in the area adjacent the metallic support which excessive temperature conditions functioned in due course to cause disintegration of the metal in the support.

It is an object of the instant invention to provide a method for providing an internal cavity of a domestic or industrial furnace or boiler with a self-sustaining combustion chamber for use in reconditioning said domestic or industrial furnace or boiler.

It is a further object of the instant invention to provide a self-sustaining combustion chamber for installation in the internal cavity of a domestic or industrial furnace or boiler to be reconditioned.

The foregoing objects are accomplished in accordance with the instant invention by providing a combustion chamber kit for reconditioning domestic or industrial furnaces and boilers comprising a self-sustaining support lined with a thermal insulating material. The self-sustaining support for the combustion chamber comprises a relatively light gauge metallic sheet having corrugations formed therein so that when the metallic sheet is formed into a cylinder the corrugations extend generally in an axial direction. A portion of each of the corrugations adjacent but spaced from each of the opposite edges of the sheet forming the opened ends of the cylinder formed by rolling the sheet upon itself is crushed to form a fold line extending circumferentially of the cylinder and substantially perpendicular to the direction of the corrugations. The cylinder formed by the sheet constitutes the support for the combustion chamber which is to be positioned in the internal cavity of the furnace, access to which is through an entrance passageway having a relatively small diameter. In providing the domestic or industrial furnace or boiler with a combustion chamber, a corrugated metal sheet, as described above, is formed into a cylinder having a predetermined diameter consonant with the heating requirements of the furnace or boiler. The formed cylinder is then rolled upon itself into a unit having a total extent in a direction perpendicular to its longitudinal axis substantially smaller than the predetermined diameter of the original cylinder and the entrance passageway of said domestic furnace or boiler so that it may be inserted through the relatively small passageway in the wall of a domestic furnace or boiler for positioning within the internal cavity thereof. When inside the cavity, the cylinder is unrolled to its original configuration. The edges of the cylinder forming the open ends thereof are then creased along each of the fold lines so as to form strengthening flanges for the support wherein, in the preferred embodiment of the invention, each of the flanges has a maximum outside diameter larger than the original outside diameter of the cylinder. A thermal insulating material, formed to fit snugly within the cylinder formed by the metallic sheet, as by exerting slight resilient pressure on substantially all adjacent surfaces of the metallic sheet, is inserted into the cylinder and positioned therein with a butt type joint. In the preferred form of the invention, the thermal insulating material comprises a refractory fiber felt. The thermal insulating material is provided with an opening aligned with an opening in the cylinder formed by the metallic sheet and wherein each opening is aligned with the entrance passageway in the wall of the domestic or industrial furnace or boiler so that the burner blast tube may be inserted therethrough.

The invention will be more fully understood and further objects and advantages thereof will become apparent when reference is made to the following detailed description of a preferred embodiment of the invention and the accompanying drawings in which:

FIG. 1 is a plan view of a sheet of material used in accordance with the instant invention;

FIG. 2 is a pictorial representation of the sheet material of FIG. 1 formed into a cylinder;

FIG. 3 is a pictorial representation of the cylinder of FIG. 2 rolled upon itself;

FIG. 4 is a pictorial representation of a combustion chamber formed in accordance with the instant invention;

Figure 5:
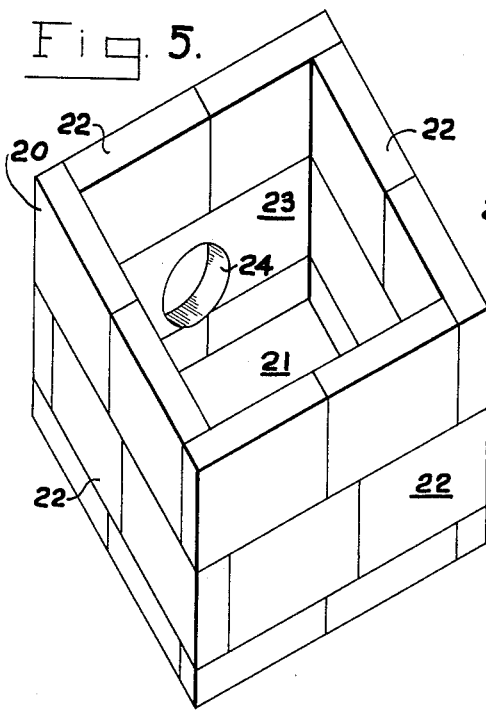
FIG. 5 is a pictorial representation of a domestic furnace with the top removed.

Referring more particularly to the drawings, FIGS. 1–4, inclusive, illustrate the steps in the formation of a combustion chamber which may be utilized in reconditioning domestic or industrial furnaces or boilers by the insertion of a combustion chamber of this type into the internal cavity of the domestic furnace or boiler such as illustrated in FIGS. 5–8, inclusive. In FIG. 1, there is illustrated a sheet 1 comprising metal such as stainless steel having a thickness between 0.002 and 0.020 inch and which, in the preferred embodiment of the instant invention, has a thickness of approximately 0.004 inch. The sheet 1 has substantially parallel edges 2 and 3 with corrugations 4 extending the full length of the sheet 1 between the edges 2 and 3 and generally perpendicular thereto. At a predetermined position, the sheet 1 is provided with an opening 5 having a diameter consonant with the heating requirements of the furnace or boiler to be accommodated. The sheet 1 is further provided with a series of openings 6 and a plurality of deformable tabs 7 for purposes to be explained later. Adjacent to but spaced from each of the edges 2 and 3, a portion of each of the corrugations 4 is flattened to form fold lines 8 and 9 extending generally perpendicular to the corrugations 4.

As illustrated in FIG. 2, the sheet 1 has been formed into a cylinder 10 having opened ends defined by the edges 2 and 3. In most instances, the cylinder for a domestic furnace or boiler has an axial extent of approximately 16 inches while an industrial furnace or boiler has an axial extent of approximately 24 inches. Although, in the preferred form of the invention, the corrugations 4 are utilized to provide axial strength to the cylinder 10, it is to be understood that other methods, such as reinforcing rods, may be utilized for such purpose. The diameter of the cylinder 10 is defined by placing the deformable tabs 7 through the appropriate openings 6 in the sheet 1 and thereafter secured therein by twisting the tabs 7 upon themselves. As illustrated in FIG. 1, the openings 6 are so positioned that the sheet 1 may be formed into a cylinder having a diameter range extending from 9 to 13 inches, inclusive. As explained above, the cylinder 10 comprises a relatively light gauge metal which is readily flexible in a radial direction so as to be easily rolled upon itself so as to form a cylindrical-like unit, the total extent of which in a direction substantially perpendicular to the longitudinal axis thereof is substantially smaller than the original diameter of the cylinder for a purpose to be described.

FIG. 4 illustrates a combustion chamber in its operational condition. The cylinder 10 has an upper flange 11 and a lower flange 12 formed by bending the cylinder 10 along the fold lines 8 and 9 until the flanges extend substantially in a radial direction from the cylinder 10. As illustrated in FIG. 4, the flanges 11 and 12 extend generally outwardly from the cylinder 10 but it is to be understood that for the purposes of this invention these flanges 11 and 12 may extend generally inwardly from the cylinder 10. The flanges 11 and 12 provide a strengthening characteristic of such a nature to the cylinder 10 that the cylinder 10 forms a self-sustaining support. A liner 13 comprising a flexible thermal insulating material, which in the preferred embodiment of the instant invention is of a fibrous material such as a refractory fiber felt, having a thickness from 1/8 to 1 1/2 inches and in the preferred embodiment a thickness of 1/2 inch, of the type manufactured and marketed by Johns-Manville Corporation under the tradename "Cerafelt," is positioned within the cylinder 10 and in contiguous relationship with the inner surface thereof. However, it is to be understood that other types of thermal insulating material may be utilized within the scope contemplated by the instant invention. The liner 13 is provided with an opening 19, illustrated in FIG. 8, and is positioned in the cylinder 10 so that the opening 19 is aligned with the opening 5 in the cylinder 10. The opening 19 has a diameter smaller than the diameter of the blast tube of the furnace to be accommodated so that the portions of the liner 13 adjacent the opening 19 are in intimate contact with the blast tube. A blast tube sleeve 14, comprising a metallic sheet rolled upon itself to form the sleeve 14, is secured to the portions of the cylinder 10 defining the opening 5 by a plurality of deformable tabs 16. A plurality of wire clips 17 each having prongs 18 which are adapted to be imbedded in the liner 13 are secured to the flange 11 for holding the liner 13 of thermal insulating material in the desired position.

FIGS. 5-8, inclusive, illustrate the steps employed in providing a domestic or industrial furnace or boiler with a combustion chamber of the type disclosed in the instant invention. FIG. 5 illustrates a domestic type of furnace 20 having a base 21 and side walls 22. As illustrated in FIGS. 5-8, inclusive, the furnace 20 appears to be readily accessible from the top but it is to be understood that this is for illustration purposes only and in reality, the furnace 20 has an internal cavity 23 formed by the base 21 and the side walls 22 with access to the internal cavity 23 only through an entrance passageway 24 having a relatively small cross-sectional area. As illustrated in FIGS. 5-8, inclusive, the entrance passageway is substantially cylindrical but other cross-sectional configurations may be utilized. However, in all instances the greatest extent in a transverse direction of the entrance passageway is substantially smaller than the diameter of the cylinder 10.

Figure 6:
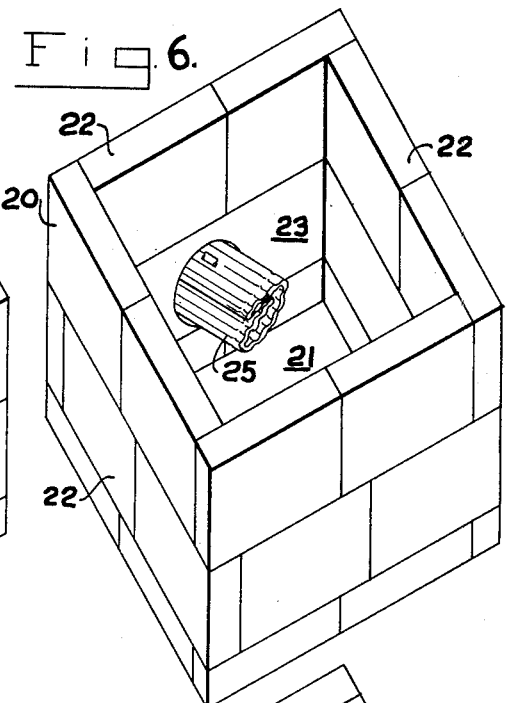
FIGS. 6–8, inclusive, illustrate the steps of providing the furnace of FIG. 5 with a combustion chamber in accordance with the instant invention.
Figure 7:
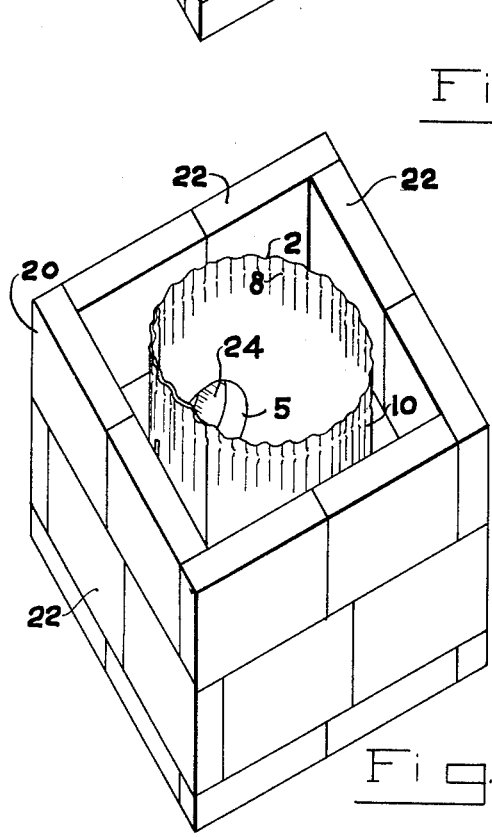
Figure 8:
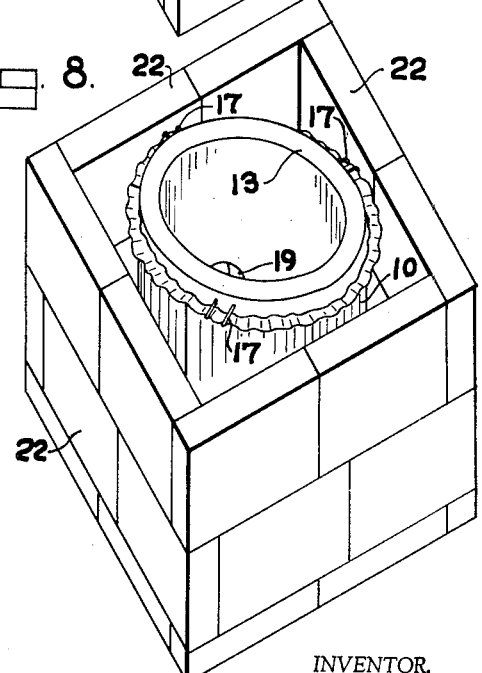

The domestic furnace 20 illustrated in FIG. 5 is reconditioned by providing said furnace with a combustion chamber of the type illustrated in FIG. 4 in accordance with the following method. A metallic sheet 1 is formed into a cylinder 10 having a diameter determined in accordance with the capacity of the furnace to be reconditioned. The cylinder 10 is rolled upon itself to form a cylindrical-like unit 25 the thickest portion of which measured in a direction substantially perpendicular to the longitudinal axis thereof, is substantially smaller than the original diameter of the cylinder. As illustrated in FIG. 6, the rolled unit 25 is inserted through the entrance passageway 24 in the side wall 22 of the furnace 20. When within the cavity 23, the unit 25 is unrolled to form a cylinder 10. The arm of the fabricator is then inserted through the entrance passageway 24 and the opening 5 in the metallic cylinder 10 to form the flanges 11 and 12 on the cylinder by folding the edges thereof along the fold lines 8 and 9. A felt of thermal insulating material comprising in the preferred embodiment of the instant invention a refractory fiber felt, having a thickness of approximately 1/2 inch, is rolled upon itself and inserted through the entrance passage 24 in the side wall 22 of the furnace 20 and through the opening 15 in the metallic cylinder 10. When within the cylinder 10, the thermal insulating felt is opened and placed in contiguous relationship with the inner surfaces of the cylinder 10 and the opening 19 thereof aligned with the opening 5 in the cylinder 10. A plurality of clips 17 having prongs 18 imbedded in the felt 13 are secured to the flanges 11 of the cylinder 10 to hold the liner 13 in proper position. A blast tube sleeve 14 is then secured by the tabs 16 to the portions of the cylinder 10 defining the opening 5 to form a combustion chamber within the furnace as illustrated in FIG. 8 of the drawing. The blast tube (not shown) of the furnace is then inserted through the sleeve 14 and opening 19 for operation of the furnace.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method for forming a combustion chamber for reconditioning appliances having an internal cavity access to which is through an entrance passageway having a relatively small cross-sectional configuration comprising:

(a) providing a metallic sheet having a thickness between about 0.002 and 0.020 inches so that said metallic sheet is very flexible, (b) providing said metallic sheet with a plurality of corrugations running substantially parallel to each other and to the free edges of said metallic sheet to impart dimensional stability to said metallic sheet in one direction and said metallic sheet having an opening therein, (c) placing the free edges of said metallic sheet into overlapping relationship to form a tube having a predetermined transverse cross-sectional area, (d) securing together the overlapped edges to retain said metallic sheet in said tubular form, (e) folding said metallic sheet in said tubular form upon itself along lines extending generally parallel to the axis of said metallic sheet in said tubular form until the portions defining each half of the circumference thereof are adjacent to each other, (f) forming said folded tubular metallic sheet into a generally tubular unit having a transverse cross-sectional area substantially smaller than the transverse cross-sectional area of said metallic sheet in said tubular form, (g) inserting said generally tubular unit through said entrance passageway of said appliance into said internal cavity thereof, (h) said entrance passageway having a transverse cross-sectional area larger than said transverse cross-sectional area of said generally tubular unit but substantially smaller than said transverse cross-sectional area of said metallic sheet in said tubular form, (i) forming said generally tubular unit while within said internal cavity back into the original form of said metallic sheet in said tubular form, (j) forming an integral flange on at least one end of said metallic sheet in said tubular form while within said internal cavity to impart strengthening characteristics thereto so that said metallic sheet in said tubular form is self-sustaining and (k) providing said metallic sheet in said tubular form while within said internal cavity with a thermal insulating material inserted through said entrance passageway and said opening in said metallic sheet and placed in contiguous relationship with the internal surface of said metallic sheet in said tubular form.

2. A method for forming a combustion chamber for reconditioning appliances having an internal cavity access to which is through an entrance passageway having a relatively small cross-sectional configuration comprising:

(a) providing a metallic sheet having a pair of opposite substantially parallel ends and edges and having a thickness between about 0.002 and 0.20 inches so that said metallic sheet is very flexible, (b) forming corrugations in said metallic sheet with the corrugations thereof extending the length of the sheet between said ends and substantially perpendicular thereto and with said corrugations running substantially parallel to said edges to impart dimensional stability to said metallic sheet in one direction and said metallic sheet having an opening therein, (c) flattening a portion of each of said corrugations adjacent to but spaced from at least one of said ends to form a fold line extending generally perpendicular to said corrugations, (d) placing said edges of said metallic sheet into overlapping relationship to form a tube having a predetermined transverse cross-sectional area, (e) securing together the overlapped edges to retain said metallic sheet in said tubular form, (f) folding said metallic sheet in said tubular form upon itself along lines extending generally parallel to the axis of said metallic sheet in said tubular form until the portions defining each half of the circumference thereof are adjacent to each other, (g) forming said folded tubular metallic sheet into a generally tubular unit having a transverse cross-sectional area substantially smaller than the transverse cross-sectional area of said metallic sheet in said tubular form, (h) inserting said generally tubular unit through said entrance passageway of said appliance into said internal cavity thereof, (i) said entrance passageway having a transverse cross-sectional area larger than said transverse cross-sectional area of said generally tubular unit but substantially smaller than said transverse cross-sectional area of said metallic sheet in said tubular form, (j) forming said generally tubular unit while within said internal cavity back into the original form of said metallic sheet in said tubular form, (k) bending said metallic sheet in said tubular form along said fold line to form an integral flange on at least one end of said metallic sheet in said tubular form while within said internal cavity to impart strengthening characteristics thereto so that said metallic sheet in said tubular form is self-sustaining, and (l) providing said metallic sheet in said tubular form while within said internal cavity with a thermal insulating material inserted through said entrance passageway and said opening in said metallic sheet and placed in contiguous relationship with the internal surface of said metallic sheet in tubular form.

3. A method for forming a combustion chamber for reconditioning appliances having an internal cavity access to which is through an entrance passageway having a relatively small cross-sectional configuration comprising:

(a) providing a metallic sheet having a pair of opposite substantially parallel ends and edges and having a thickness between about 0.002 and 0.20 inch so that said metallic sheet is very flexible, (b) forming corrugations in said metallic sheet with the corrugations thereof extending the length of the sheet between said ends and substantially perpendicular thereto and with said corrugations running substantially parallel to said edges to impart dimensional stability to said metallic sheet in one direction and said metallic sheet having an opening therein, (c) flattening a portion of each of said corrugations adjacent to but spaced from each of said ends to form fold lines extending generally perpendicular to said corrugations, (d) placing said edges of said metallic sheet into overlapping relationship to form a tube having a predetermined transverse cross-sectional area, (e) securing together the overlapped edges to retain said metallic sheet in said tubular form, (f) folding said metallic sheet in said tubular form upon itself along lines extending generally parallel to the axis of said metallic sheet in said tubular form until the portions defining each half of the circumference thereof are adjacent to each other, (g) forming said folded tubular metallic sheet into a generally tubular unit having a transverse cross-sectional area substantially smaller than the transverse cross-sectional area of said metallic sheet in said tubular form, (h) inserting said generally tubular unit through said entrance passageway of said appliance into said internal cavity thereof, (i) said entrance passageway having a transverse cross-sectional area larger than said transverse cross-sectional area of said generally tubular unit but substantially smaller than said transverse cross-sectional area of said metallic sheet in said tubular form, (j) forming said generally tubular unit while within said internal cavity back into the original form of said metallic sheet in said tubular form, (k) bending said metallic sheet in said tubular form along said fold lines to form integral flanges adjacent each end of said metallic sheet in said tubular form to impart strengthening characteristics thereto so that said metallic sheet in said tubular form is self-sustaining, (l) bending said metallic sheet in tubular form in said direction so that each of said flanges has a maximum outside perimeter greater than the outside perimeter of said metallic sheet in said tubular form so as to space said metallic sheet in said tubular form from the walls defining said internal cavity, and (m) providing said metallic sheet in said tubular form while within said internal cavity with a thermal insulating material inserted through said entrance passageway and said opening in said metallic sheet and placed in contiguous relationship with the internal surface of said metallic sheet in said tubular form.

References Cited in the file of this patent

UNITED STATES PATENTS

| | | |
|---|---|---|
| 711,627 | Heuer | Oct. 21, 1902 |
| 2,244,314 | Powers | June 3, 1941 |
| 2,282,293 | Christenson | May 5, 1942 |
| 2,296,392 | Marchant | Sept. 22, 1942 |
| 2,299,154 | Lair | Oct. 20, 1942 |
| 2,341,622 | Kaufman | Feb. 15, 1944 |

FOREIGN PATENTS

| | | |
|---|---|---|
| 610,978 | Canada | Dec. 20, 1960 |